United States Patent
Imai

(10) Patent No.: US 9,921,669 B2
(45) Date of Patent: Mar. 20, 2018

(54) APPARATUS AND PROGRAM FOR A TOUCH INPUT TRACKING FIGURE FOR OPERATION

(71) Applicant: Panasonic Intellectual Property Management Co., Ltd., Osaka (JP)

(72) Inventor: Tomikazu Imai, Kyoto (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 80 days.

(21) Appl. No.: 14/406,943

(22) PCT Filed: Mar. 5, 2013

(86) PCT No.: PCT/JP2013/001371
§ 371 (c)(1),
(2) Date: Dec. 10, 2014

(87) PCT Pub. No.: WO2013/186964
PCT Pub. Date: Dec. 19, 2013

(65) Prior Publication Data
US 2015/0177860 A1    Jun. 25, 2015

(30) Foreign Application Priority Data
Jun. 13, 2012    (JP) ................................. 2012-134258

(51) Int. Cl.
*G06F 3/041*    (2006.01)
*G06F 3/0488*    (2013.01)
(Continued)

(52) U.S. Cl.
CPC ............ *G06F 3/041* (2013.01); *G06F 3/0486* (2013.01); *G06F 3/0488* (2013.01);
(Continued)

(58) Field of Classification Search
CPC .. G06F 3/0485; G06F 3/04883; G06F 3/0488; G06F 3/04815; G06F 3/04886; G06F 3/04812
See application file for complete search history.

(56) References Cited

U.S. PATENT DOCUMENTS

2007/0236475 A1    10/2007  Wherry
2007/0262965 A1    11/2007  Hirai et al.
(Continued)

FOREIGN PATENT DOCUMENTS

CN    1655094 A    8/2005
CN    201947341 U    8/2011
(Continued)

OTHER PUBLICATIONS

Extended European Search Report isued in Application No. 13804627.1 dated Jun. 5, 2015.
(Continued)

*Primary Examiner* — Sepehr Azari
(74) *Attorney, Agent, or Firm* — McDermott Will & Emery LLP

(57) ABSTRACT

Operation display device includes a display, an operation part, and an arithmetic and control part. The arithmetic and control part includes: an analysis processing part analyzing an operation content of an operation object; and a display processing part determining a shape and a position of a figure for operation displayed on the display according to the operation content analyzed by the analysis processing part. The analysis processing part has a function of classifying the operation content of the operation object into a moving operation for changing the position of the figure for operation and an adjustment operation for adjusting a control amount. When a contact position to the operation part is out of a tracking range set in accordance with the position of the figure for operation, the display processing part displaces the (Continued)

figure for operation so that the contact position of the operation object is within the tracking range.

15 Claims, 2 Drawing Sheets

(51) Int. Cl.
*H05B 37/02* (2006.01)
*G06F 3/0486* (2013.01)
*G06F 3/0484* (2013.01)
*G06T 11/00* (2006.01)

(52) U.S. Cl.
CPC ...... *G06F 3/04847* (2013.01); *G06F 3/04883* (2013.01); *G06T 11/001* (2013.01); *H05B 37/02* (2013.01)

(56) References Cited

U.S. PATENT DOCUMENTS

| | | |
|---|---|---|
| 2007/0300182 A1 | 12/2007 | Bilow |
| 2008/0309626 A1 | 12/2008 | Westerman et al. |
| 2010/0083180 A1 | 4/2010 | Matsubara et al. |
| 2010/0293508 A1* | 11/2010 | Hwang ............... G06F 3/04886 715/846 |
| 2011/0285636 A1* | 11/2011 | Howard .............. G06F 3/04815 345/173 |
| 2012/0030624 A1 | 2/2012 | Migos |

FOREIGN PATENT DOCUMENTS

| | | |
|---|---|---|
| CN | 102262818 A | 11/2011 |
| JP | 06-067796 A | 3/1994 |
| JP | 11-212726 A | 8/1999 |
| JP | 2006-139615 A | 6/2006 |
| JP | 2008-508600 A | 3/2008 |
| JP | 2010-079773 A | 4/2010 |
| JP | 2011-171179 A | 9/2011 |
| WO | 2006-020304 A2 | 2/2006 |
| WO | 2006-027924 A1 | 3/2006 |

OTHER PUBLICATIONS

International Search Report issued in PCT/JP2013/001371, dated May 7, 2013, with English translation.

* cited by examiner

APPARATUS AND PROGRAM FOR A TOUCH INPUT TRACKING FIGURE FOR OPERATION

RELATED APPLICATIONS

This application is the U.S. National Phase under 35 U.S.C. § 371 of International Application No. PCT/JP2013/001371, filed on Mar. 5, 2013, which in turn claims the benefit of Japanese Application No. 2012-134258, filed on Jun. 13, 2012, the disclosures of which Applications are incorporated by reference herein.

TECHNICAL FIELD

The present invention relates to an operation display device that controls a load using a touch panel, and program for realizing the function of the operation display device using a computer.

BACKGROUND ART

Conventionally, the technology is proposed, in which operating of operation and stop of a load, regulation of a control amount of the load, or the like is performed with a touch panel. For example, JP 2011-171179 A (paragraph [0040]) describes that an operation knob, which can perform a rectilinear movement and a rotation, is realized with a touch panel in a dimming controller that is capable of dimming and controlling colors.

The touch panel is arranged in piles on a screen of an display. In the touch panel, operation contents are specified so as to be associated with display information of the display. Therefore, when the operation knob performing the rectilinear movement and the rotation is imitated by the touch panel, the figure expressing the operation knob is displayed by the display, and the figure is made to change in response to movement of an operation object, such as a fingertip, a nib, or the like, which touches the touch panel.

For example, in order to imitate the operation knob performing the rectilinear movement, the display content of the display is set so that the position of the figure of the operation knob is changed on the straight line defined as a moving range of the operation knob. In this case, if the operation object is moved along the straight line so as not to separate from the figure of the operation knob after the operation object is touched on the position where the figure of the operation knob is displayed, it is common to be configured so that the position of the figure of the operation knob is changed in response to the movement of the operation object.

In order to imitate the operation knob performing the rotation, the display content of the display is set so that the figure of the operation knob rotates around a predetermined center of rotation. In this case, if an operation object is moved along an arc line around the center of rotation so as not to separate from the figure of the operation knob after the operation object is touched on the position where the figure of the operation knob is displayed, it is common to be configured so that the rotary position of the figure of the operation knob is changed in response to the movement of the operation object.

Incidentally, the operation knob on the touch panel is not an actual structure, and the surface of the touch panel is a plane. For the reason, the feel obtained when the operation object is touched to the operation knob cannot be distinguished from the feel obtained when the operation object is touched to other parts of the touch panel. Therefore, in order to move the operation object so that the operation object does not separate from the operation knob, a user needs to move the operation object while viewing and checking the position of the operation knob.

On the other hand, the user needs to perform the operation for dimming and controlling colors while viewing and checking the lighting state of a lighting apparatus. Therefore, if the user tries to perform dimming and controlling colors using the equipment with the touch panel, the user needs to view both the position of the operation object and the lighting state of the lighting apparatus. Accordingly, there is the problem that the load to the user enlarges.

DISCLOSURE OF INVENTION

The object of the present invention is to provide an operation display device that, in an apparatus adjusting a control amount of a load with a touch panel, a user can change is capable of changing the control amount without viewing the touch panel, and then improves a user's convenience. Further, the object of the present invention is to provide a program for realizing the function of the operation display device to a computer.

An operation display device according to the present invention includes: a display on which a figure for operation for adjusting a control amount instructed to a load is displayed; an operation part putted on a screen of the display, the operation part being configured to output a signal indicating a contact position of an operation object; an analyzing processing part configured to analyze an operation content of the operation object by receiving the signal from the operation part and associating the contact position of the operation object to the operation part with the figure for operation; a display processing part configured to determine a form and a position of the figure for operation to be displayed on the display according to the operation content analyzed by the analyzing processing part; and a load control part configured to adjust the control amount according to the operation content analyzed by the analyzing processing part. The analyzing processing part has a function of classifying the operation content into a moving operation for changing the position of the figure for operation and an adjustment operation for adjusting the control amount, the analyzing processing part being configured to determine that the operation content is the moving operation when the contact position of the operation object to the operation part is deviated from a tracking range set in accordance with the position of the figure for operation. The display processing part is configured to displace the figure for operation so that the contact position of the operation object is positioned within the tracking range when the analyzing processing part determines that the operation content is the moving operation.

In the operation display device, desirably, in a case where a position at which the operation object starts contacting to the operation part is in an operation area set in the figure for operation, in a time period until the operation object separates from the operation part, the analyzing processing part is configured to determine that the operation content is the adjustment operation while the contact position of the operation object is in the tracking range, the analyzing processing part being configured to determine that the operation content is the moving operation while the contact position of the operation object is out of the tracking range.

In the operation display device, desirably, in a case where a position at which the operation object starts contacting to the operation part is in an operation area set in the figure for operation, unless the operation object moves until a prescribed determination time period passes after the operation object starts contacting to the operation part, the analyzing processing part is configured to forbid displacement of the figure for operation in a time period until the operation object separates from the operation part.

In the operation display device, desirably, when a position at which the operation object starts contacting to the operation part is in the tracking range, the analyzing processing part is configured to instruct the display processing part so that the control amount instructed to the load control part is made to correspond to the position and the form of the figure for operation is made to correspond to the control amount.

In the operation display device, desirably, the figure for operation is a rectilinear operating part including a slider moving in a straight line. The tracking range is set so as to contain, along a moving track of the slider, a whole area of the moving track.

In the operation display device, desirably, the figure for operation is a rotation operation part including a dot indicating a dial, which rotates around a center of rotation, and a rotary of the dial. The tracking range is set so as to contain, along a moving track of the dot, a whole area of the moving track.

Desirably, the analyzing processing part is configured to set a rotating ratio so that an angle of rotation of the dial is smaller than an angle of rotation of the operation object.

In the operation display device, desirably, in a time period until the operation object separates from the operation part after the analyzing processing part determines that the operation content is the adjustment operation, the analyzing processing part is configured to forbid displacement of the figure for operation and adjust the control amount according to the angle of rotation of the operation object while the operation object continues rotating.

In the operation display device, desirably, the analyzing processing part, if the operation object separates from the operation part after contacting to the operation part, is configured to instruct the display processing part so that the figure for operation is returned to an initial position.

A program according to the present invention causes a computer to function as an apparatus. The apparatus includes: a display on which a figure for operation for adjusting a control amount instructed to a load is displayed; an operation part putted on a screen of the display, the operation part being configured to output a signal indicating a contact position of an operation object; an analyzing processing part configured to analyze an operation content of the operation object by receiving the signal from the operation part and associating the contact position of the operation object to the operation part with the figure for operation; and a display processing part configured to determine a form and a position of the figure for operation to be displayed on the display according to the operation content analyzed by the analyzing processing part. The analyzing processing part has a function of classifying the operation content into a moving operation for changing the position of the figure for operation and an adjustment operation for adjusting the control amount. The display processing part, when the contact position of the operation object to the operation part is out of a tracking range set in accordance with the position of the figure for operation, is configured to displace the figure for operation so that the contact position of the operation object is positioned within the tracking range. The present invention is not limited to an invention of the program and may be an invention of a readable medium recording the program.

According to the configuration of the present invention, in the equipment that adjusts the control amount of the load with the touch panel, there is an advantage that a user can changes the control amount without viewing the touch panel, and it is possible to improve a user's convenience.

BRIEF DESCRIPTION OF DRAWINGS

Preferred embodiments of the present invention will now be described in further details. Other features and advantages of the present invention will become better understood with regard to the following detailed description and accompanying drawings where.

DESCRIPTION OF EMBODIMENTS

Hereinafter, an embodiment will be described using an example in the case of including a first operating part (hereinafter, referred to as a "rectilinear operating part") that performs a rectilinear movement, and a second operating part (hereinafter, referred to as a "rotation operation part") that rotates. However, the configuration may be used, in which only one of the rectilinear operating part and the rotation operation part is included.

Figure 1:
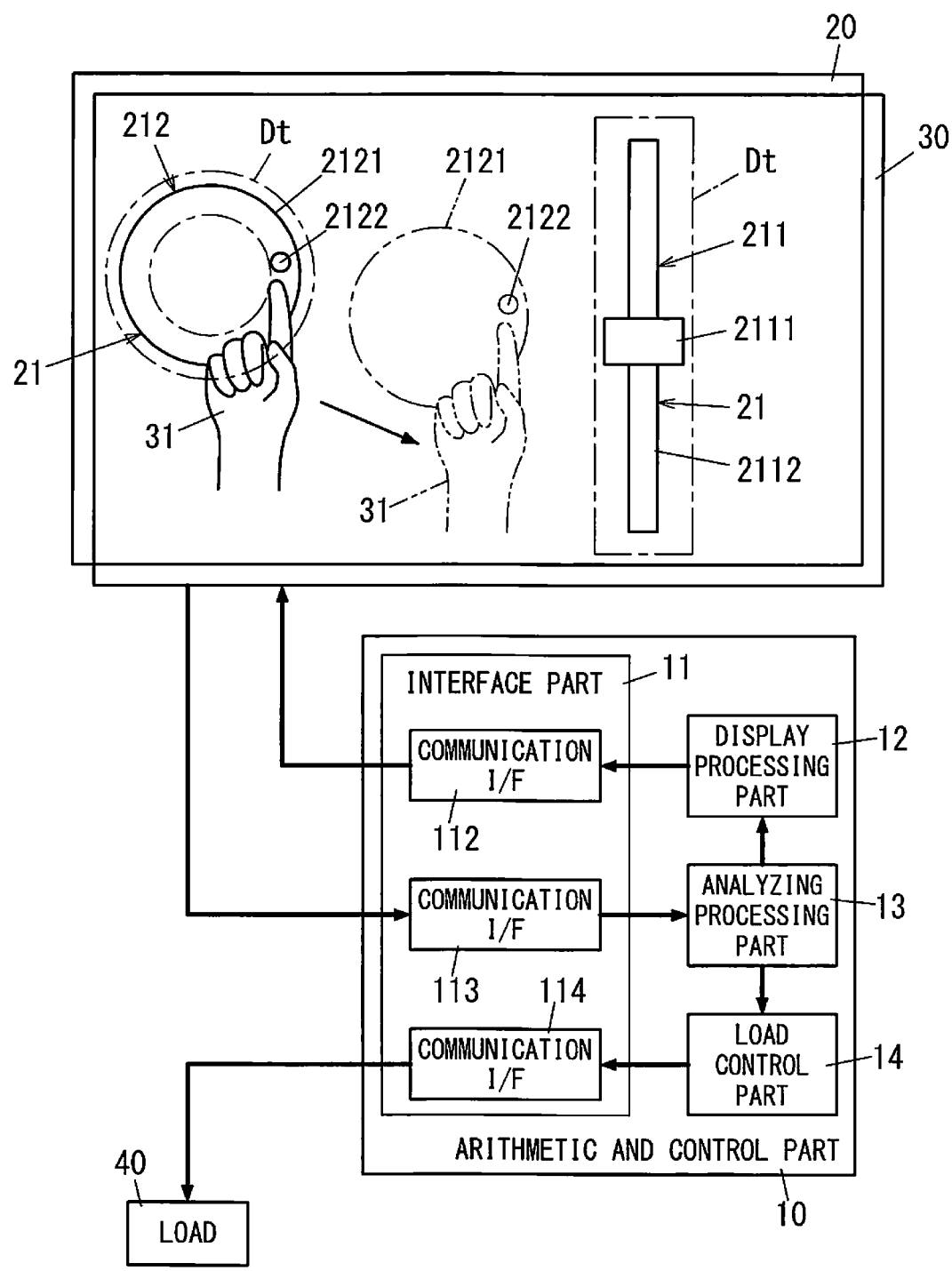
FIG. 1 is a configuration diagram showing an embodiment.

As shown in FIG. 1, an operation display device includes a display 20, an operation part 30, and an arithmetic and control part 10. The display 20 includes a flat-panel display. The operation part 30 includes a touch panel arranged in piles on a screen of the display 20. The arithmetic and control part 10 is configured to determine display contents of the display 20 and an input to the operation part 30. The display 20 is configured to display a FIG. 21 for operation described below. The operation part 30 is configured to output, to the arithmetic and control part 10, a signal indicating a contact position of an operation object 31 to the operation part 30.

The flat-panel display used in the display 20 is a dot-matrix type display, and is selected from a liquid crystal display, an organic electroluminescence display, or the like. The touch panel that constitutes the operation part 30 may be any of a resistance film type, an electrostatic capacitance type, an ultrasonic type, and optical type. However, the touch panel is desirable to be selected from the resistance film type and the electrostatic capacitance type that are has an easy configuration. The operation part 30 is operated by using the operation object (contact body) 31, such as a fingertip or a nib.

The arithmetic and control part 10 has a function of controlling a load 40 according to the display content of the display 20 and the operation content to the operation part 30 (operation to the operation part 30). Therefore, the arithmetic and control part 10 includes an interface part 11 that is configured to connect the display 20, the operation part 30, and the load 40. The interface part 11 includes plural communication interfaces (communication I/Fs) 112, 113, and 114 that respectively connect the display 20, the operation part 30, and the load 40.

The arithmetic and control part 10 includes a display processing part 12, an analyzing processing part 13, and a load control part 14. The display processing part 12 is configured to determine the display content of the display 20. The analyzing processing part 13 is configured to analyze the operation content to the operation part 30 (operation to the operation part 30). The load control part 14 is configured to instruct an operation for the load 40. The analyzing processing part 13 has, as basic functions, the following functions: a function of detecting timings and positions of pen-down (namely, contact) and pen-up (namely, separation) of the operation object 31 to the operation part 30; and a function of detecting a position of the operation object 31 under pen-down. In other words, the analyzing processing part 13 is configured to receive, from the operation part 30, the signal indication the contact position of the operation object 31 to the operation part 30, and then detect the contact position of the operation object 31 to the operation part 30. According to the present embodiment, a function of detecting operations called the pinch and flicks is unnecessary and then, is not taken into consideration.

The display processing part 12 is configured to display, on the screen of the display 20, the FIG. 21 for operation for adjusting the control amount instructed to the load 40. The display processing part 12 has a function of determining the form and the position of the FIG. 21 for operation displayed on the screen of the display 20 based on the operation content to the operation part 30 (operation to the operation part 30) is analyzed by the analyzing processing part 13. The load control part 14 is configured to adjust the control amount instructed to the load 40 according to the operation content analyzed by the analyzing processing part 13 (operation analyzed by the analyzing processing part 13).

The arithmetic and control part 10 is realized with the combination of the interface part 11 and a microcomputer that have suitable configuration. However, the arithmetic and control part 10 may be constituted of the processor that operates according to a program instead of the microcomputer. The arithmetic and control part 10 may be unified with the display 20 and the operation part 30 in one housing. The arithmetic and control part 10 may separate into two housings by storing the load control part 14 and communication I/F 114 of the arithmetic and control parts 10 to another housing. The arithmetic and control part 10, the display 20, and the operation part 30 may be used to not an exclusive apparatus but an existing apparatus including a touch panel and a processor, such as a smart phone or a tablet terminal. In this case, the program for realizing the following functions is mounted into the existing equipment, and the configuration is adopted, in which the existing equipment communicates with equipment including the load control part 14 and communication I/F 114.

The FIG. 21 for operation in the present embodiment includes a rectilinear operating part 211 and a rotation operation part 212. The rectilinear operating part 211 includes a slider 2111 and a guide 2112. The slider 2111 has a rectangular shape. The guide 2112 specifies a moving range of the slider 2111 on a straight line. That is, the slider 2111 is configured to move on the specified straight line. The rotation operation part 212 includes a circular dial 2121 and a dot 2122. The dial 2121 is rotated around a center. The dot 2122 shows a standard of an angle of rotation (rotation position) of the dial 2121.

Therefore, when the FIG. 21 for operation is the rectilinear operating part 211, the change of the position of the slider 2111 within the range of the guide 2112 becomes the change of form. When the FIG. 21 for operation is the rotation operation part 212, the angle of rotation of the rotation operation part 212 changes, and the change of the position of the dot 2122 to the center of rotation of the dial 2121 becomes the change of form.

The analyzing processing part 13 is configured to analyze the operation content to the operation part 30 (operation to the operation part 30) while associating the operation part 30 with the FIG. 21 for operation currently displayed on the display 20. First, the analyzing processing part 13 is configured to receive, from the operation part 30, the signal indicating the contact position of the operation object 31 to the operation part 30, and then detect the contact position of the operation object 31 to the operation part 30. Then, the analyzing processing part 13 is configured to analyze the operation content to the operation object 31 (operation to the operation object 31) by associating the contact position of the operation object 31 to the operation part 30 with the FIG. 21 for operation. That is, the analyzing processing part 13 is configured to analyze the operation performed from the operation object 31 to the operation part 30 by associating the contact position detected by the operation part 30. When the FIG. 21 for operation expresses the rectilinear operating part 211 that moves up and down, the analyzing processing part 13 is configured to distinguish an operation of moving the slider 2111 upward and an operation moving the slider 2111 downward. When the FIG. 21 for operation expresses the rotation operation part 212, the analyzing processing part 13 is configured to distinguish an operation of rotating the dial 2121 in the clockwise direction, and an operation rotated in the counterclockwise direction.

It is possible to adjust the control amount instructed to the load 40 by the operations reversing mutually being performed. For example, when the load 40 is a lighting apparatus that is capable of controlling colors and dimming, it is possible to perform the increasing/decreasing in the optical power of the light emitted from the lighting apparatus, and the regulation of the light color of the light emitted from the lighting apparatus by performing the movement of the slider 2111 or the rotation of the dial 2121. The load 40 is not limited to the light apparatus. The load 40 may be an air conditioner, an electric curtain, an electric shutter, or the like. If the load 40 is the air conditioner, the operation display device is used for regulation of preset temperature or regulation of air capacity. If the load 40 is the electric curtain or the electric shutter, the operation display device is used for regulation of an opening and closing amount.

The analyzing processing part 13 has a function of classifying the operation content of the user to the operation part 30 into the moving operation and the adjustment operation. The moving operation is an operation for changing the position of the FIG. 21 for operation without changing the form of the FIG. 21 for operation. The adjustment operation is an operation for changing the form of the FIG. 21 for operation in order to show the change of the control amount of the load 40. That is, the analyzing processing part 13 is configured to classify the operation of the operation object 31 (operation performed from the operation object 31 to the operation part 30) into the moving operation and the adjustment operation. As described above, the adjustment operation means an operation for performing the movement of the slider 2111 and the rotation of the dial 2121. On the other hand, the moving operation means an operation for displacing the rectilinear operating part 211 or the rotation operation part 212 in the screen of the display 20. In other words, the moving operation means that the operation content analyzed by the analyzing processing part 13 (operation analyzed by the analyzing processing part 13) is an operation content about the FIG. 21 for operation, and the adjustment operation means that the operation content analyzed by the analyzing processing part 13 (operation analyzed by the analyzing processing part 13) is an operation content about the control amount of the load 40.

When detecting pen-down of the operation object 31, the analyzing processing part 13 is configured to determine whether or not the position of the pen-down is inside of the operation area associated with the slider 2111 or the dial 2121. The operation area is set to the FIG. 21 for operation, and generally means an area inside an area where the slider 2111 or the dial 2121 is displayed in the display 20. However, the operation area may be set a little more widely than the above area.

The analyzing processing part 13 is configured to determine that the operation content of the operation object 31 (operation of the operation object 31) is the adjustment operation when the position of pen-down is in the operation area. The analyzing processing part 13 is configured to track the position of the operation object 31 while the operation object 31 is moving after the pen-down. The analyzing processing part 31 changes the position of the slider 2111 or the guide 2112 so as to follow the position of the operation object 31 while the operation object 31 moves within a tracking range Dt specified to the slider 2111 or the dial 2121.

The tracking range Dt includes the whole area for the slider 2111, in which the slider 2111 is capable of moving along the moving track of the slider 2111. The tracking range Dt includes the whole area for the dial 2121, in which the dot 2122 is capable of moving along the moving track of the dot 2122. The tracking range Dt is defined by the position of the FIG. 21 for operation. The tracking range Dt is a range virtually set to the analyzing processing part 13 and is not displayed on the screen of the display 20, if it displays so that it may distinguish from other regions in the screen of the display 20. However, if being displayed so as to distinguish with the other area on the screen of the display 20, the tracking range Dt becomes a target at the time of moving the operation object 31.

The tracking range Dt set so as to corresponding to the slider 2111 is set along the moving direction of the slider 2111, and is set so that the length in a direction orthogonal to the moving direction of the slider 2111 (width of the rectilinear operating part 211) is longer than the slider 2111. That is, the tracking range Dt corresponding to the rectilinear operating part 211 is formed into a rectangular shape. The tracking range Dt set so as to corresponding to the dial 2121 is set along the rotating direction of the dial 2121, and is set into a strip shape so as to be wider than the diameter of the dot 2122. That is, the tracking range Dt corresponding to the dial 2121 is formed into a doughnut shape.

If the analyzing processing part 13 notifies the display processing part 12 that the moving range of the operation object 31 after the pen-down is inside of the tracking range Dt, the display processing part 12 does not change the position of the FIG. 21 for operation, and moves the position of the slider 2111 or the dial 2121 so as to follow the operation object 31.

On the other hand, if the analyzing processing part 13 notifies the display processing part 12 that the moving range of the operation object 31 after the pen-down is deviated outside the tracking range Dt, the display processing part 12 displace the position of the FIG. 21 for operation. In this time, while the control amount to the load 40 is maintained, the position of the slider 2111 or the dot 2122 is matched with the position of the operation object 31. In other words, when the contact position of the operation object 31 to the operation part 30 (contact position detected by the operation part 30) is deviated outside the tracking range Dt, the analyzing processing part 13 determines whether or not the operation content of the operation object 31 (operation of the operation object 31) is the movement operation. When the analyzing processing part 13 determines that the operation content (operation) is the movement operation, the display processing part 12 displaces the FIG. 21 for operation so that the contact position of the operation object 31 may be within the tracking range Dt.

Therefore, in the case where a user moves the operation object 31 without viewing the FIG. 21 for operation after contacting the operation object 31 at the slider 2111 or the dial 2121, even if the position of the operation object 31 is deviated from the tracking range Dt, the FIG. 21 for operation is automatically displaced in the position of the operation object 31. That is, even if the moving trucking of the operation object 31 winds after the user starts the operation of the slider 2111 or the dial 2121, since the FIG. 21 for operation follows and moves to the position of the operation object 31, it is possible to change the control amount of the load 40 continuously. In other words, even if the user is not viewing the screen of the display 20 after the user starts the operation for the operation object 31 in accordance with the position of the slider 2111 or the dial 2121, the user can adjust the control amount of the load 40.

The display processing part 12 is configured to return the FIG. 21 for operation to an initial position if the analyzing processing part 13 detects the pen-up and detects the end of the operation to the FIG. 21 for operation. That is, when the operation object 31 is separated from the operation part 30 after contact with the operation part 30, the analyzing processing part 13 instructs the display processing part 12 so as to return the FIG. 21 for operation at the initial position. The display processing part 12 returns the FIG. 21 for operation to the initial position. By returning the FIG. 21 for operation to the initial position, the FIG. 21 for operation is always displayed on the same position on the screen of the display 20.

In the state where two or more FIG. 21 for operation are displayed on one screen of the display 20, if an operation of one of the FIG. 21 for operation is started, the above-mentioned FIG. 21 for operation concerned may overlap with another FIG. 21 for operation by moving. Therefore, the analyzing processing part 13 desirably repeals an operation to another FIG. 21 for operation during the period in which the one of the FIG. 21 for operation is operated.

In the configuration mentioned above, the analyzing processing part 13 recognizes the moving operation and the adjustment operation by setting the tracking range Dt along with the FIG. 21 for operation. However, the analyzing processing part 13 may recognize the moving operation and the adjustment operation by using the moving direction of the operation object 31 from the position of pen-down.

For example, about the slider 2111, when the operation object 31 moves in the vertical direction of a screen, the analyzing processing part 13 is configured to determine that the operation of the operation object 31 is the adjustment operation. When the operation object 31 moves in other directions, the analyzing processing part 13 is configured to determine that the operation of the operation object 31 is the moving operation. Then, the analyzing processing part 13 is configured to define the range of an angle in the direction to which the operation object 31 moves from the position of the slider 2111. If the moving direction of the operation object 31 is within a range (for example, 90±10 degree, 270±10 degree) near the vertical direction, the analyzing processing part 13 may be configured to determine the operation of the operation object 31 is the adjustment operation. The analyzing processing part 13 may be configured to determine the operation of the operation object 31 is the moving operation except it. Similarly, about the dial 2121, if specifying the angle range to the tangential direction of the position corresponding to the dot 2122, the analyzing processing part 13 can distinguish the adjustment operation and the moving operation.

Incidentally, if the position of pen-down of the operation object 31 is within the operation area, the analyzing processing part 13 is configured to determine that the operation content of the operation object 31 (operation of the operation object 31) is the adjustment operation at the time of pen-down. However, if the position of pen-down of the operation object 31 is deviated from the operation area, the analyzing processing part 13 is configured to determine that the operation content of the operation object 31 (operation of the operation object 31) is the moving operation. That is, when the position of pen-down of the operation object 31 has deviated from the operation area set to the slider 2111 or the dial 2121, the analyzing processing part 13 moves the slider 2111 or the dial 2121 to the position at which the pen-down is detected. At this time, the analyzing processing part 13 performs, to the display processing part 12, the instruction for not changing the control amount of the load 40 and moving the slider 2111 or the dial 2121 to the position of the operation object 31. In the case where the position at which the operation object starts contacting to the operation part is in the operation area, in the time period until the operation object separates from the operation part, the analyzing processing part is configured to determine that the operation content of the operation object 31 (operation of the operation object 31) is the adjustment operation while the contact position of the operation object 31 is in the tracking range Dt. On the other hand, the analyzing processing part being configured to determine that the operation content of the operation object 31 (operation of the operation object 31) is the moving operation while the contact position of the operation object 31 is out of the tracking range Dt.

Figure 2:
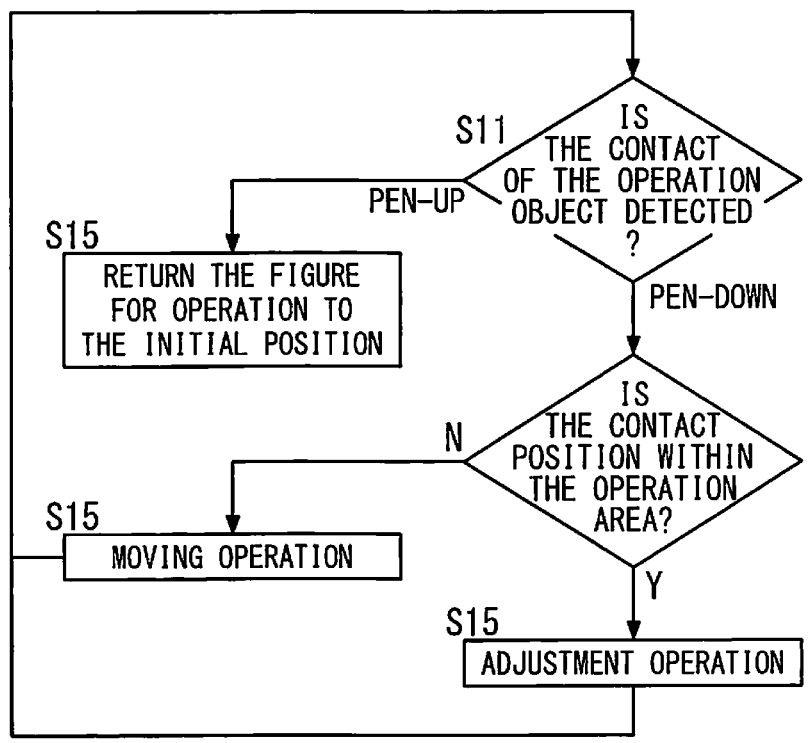
FIG. 2 is an explanatory view of an operation of the embodiment.

The above operation is summarized and shown in FIG. 2. That is, if the analyzing processing part 13 detects whether the operation object 31 contacted the operation part 30 (S11) and pen-down is detected, the analyzing processing part 13 determines whether the position at which the operation object 31 contacted is within the operation area (S12). If the position of pen-down is in the operation area (S12: Y), the analyzing processing part 13 determines that the operation content of the operation object 31 is the adjustment operation without displacing the position of the FIG. 21 for operation (S13). If the position of pen-down is out of the operation area (S12: N), the analyzing processing part 13 determines that the operation content of the operation object 31 (operation of the operation object 31) is the moving operation for displacing the FIG. 21 for operation (S14). If the analyzing processing part 13 detects pen-up after detection of pen-down (S11), the display processing part 12 returns the FIG. 21 for operation to the initial position (S15).

When two or more FIG. 21 for operation exist in the screen of the display 20, it is necessary to set a rule so that only anyone FIG. 21 for operation moves. Examples of the rule for moving the FIG. 21 for operation include moving the beforehand selected FIG. 21 for operation is moved, giving a priority to each of the FIG. 21 for operation, moving the FIG. 21 for operation according to the distance with the position of pen-down.

In the example of the operation mentioned above, when the position of pen-down of the operation object 31 is the operation area, and then the operation object 31 moves, the control amount of the load 40 is adjusted. However, when the position of pen-down of the operation object 31 is within the tracking range Dt, the control amount may be defined according to the position of pen-down. That is, when the position of pen-down is the moving range of the slider 2111 or the rotating range of the dial 2121, the control amount currently displayed on the display 20 before the pen-down may be made to progress rapidly to the control amount indicated by the position of pen-down. In other words, when the position at which the operation object 31 starts contacting to the operation part 30 is in the tracking range Dt, the analyzing processing part 13 is configured to instruct the display processing part 12 so that the control amount is made to correspond to the position and a form of the figure for operation is made to correspond to the control amount.

If this processor is added to the analyzing processing part 13, an operation for doubling the control amount of the load 40 near a desired value in an instant is attained without performing an operation of changing the control amount of the load 40 continuously. When adding this operation, the analyzing processing part 13 needs to classify the position of pen-down of the operation object 31 into the inside of the operation area, the inside of the tracking range Dt, and the outside of the range of the tracking range Dt.

In the example of operation mentioned above, in the case where the user moves the operation object 31 after touching the operation object 31 with the operation area set as the slider 2111 or the dial 2121, when the contact position of the operation object 31 is deviated from the tracking range Dt, the analyzing processing part 13 displaces the position of the FIG. 21 for operation. To this operation, the analyzing processing part 13 may be capable of selecting an operation for not moving the FIG. 21 for operation even if the operation object 31 is moved. The selection of such operation may be performed at the time from the pen-down of the operation object 31 to the start of the moving of the operation object 31.

Namely, the analyzing processing part 13 should just select the processing so that the displacement of the FIG. 21 for operation is permitted when the movement of the operation object 31 is detected during a predetermined determination time period from the pen-down, and the movement of the FIG. 21 for operation is forbidden, when the operation object 31 does not move over the determination time period from the pen-down. That is, in the case where the position at which the operation object 31 starts contacting to the operation part 30 is in the operation area, unless the operation object 31 moves until a prescribed determination time period passes after the operation object 31 starts contacting to the operation part 30, the analyzing processing part 13 is configured to forbid displacement of the FIG. 21 for operation in the time period until the operation object 31 separates from the operation part 30. When the movement of the FIG. 21 for operation is forbidden, the operation becomes the same as the conventional operation. However, the control amount may be adjusted according to the movement of the operation object 31 without moving the FIG. 21 for operation as the operation mentioned below. The selected result of the processing is validated only during the period till the pen-up of the operation object 31.

Incidentally, in the operation mentioned above, when the operation object 31 is touched with the appropriate position on the screen of the display 20, the FIG. 21 for operation is displaced to the contact position of the operation object 31. In this case, if the FIG. 21 for operation returns to the initial position immediately with the pen-up of the operation object 31, it becomes meaningless to have moved the FIG. 21 for operation. Then, the analyzing processing part 13 has the function of clocking the elapsed time from the pen-down and extending the time until the FIG. 21 for operation is returned to the initial position when the pen-up is performed within a regular determining period in the case where the pen-down of the operation object 31 is performed out of the operation area. If the operation is started before the FIG. 21 for operation is returned to the initial position, it is possible to adjust the control amount of the load 40 at the position to which the FIG. 21 for operation is moved. If the regulation of the control amount of the load 40 is ended and the analyzing processing part 13 detects the pen-up, the display processing part 12 returns the FIG. 21 for operation to the initial position as the operation mentioned above.

The configuration mentioned above is technology common to the rectilinear operating part 211 and the rotation operation part 212. Hereinafter, technology applicable to each of the rectilinear operating part 211 and the rotation operation part 212 will be described.

Although the slider 2111 is displayed on the part of the display 20 in the above-mentioned example about the rectilinear operating part 211, when displaying only the one rectilinear operating part 211 on the screen, it is desirable to make the width of the slider 2111 into substantially the same as the width of the screen of the display 20. That is, the whole surface of the screen of the display 20 becomes within the tracking range Dt, and the processing for moving the FIG. 21 for operation as the rectilinear operating part 211 is moved becomes unnecessary.

About the rotation operation part 212, the resolution as to the angle of rotation of the dial 2121 is dependent on the accuracy from which the operation part 30 detects the contact position of the operation object 31 in the example mentioned above. However, it may be required that the resolution as to the angle of rotation of the dial 2121 should be further raised depending on the use of the operation display device.

Then, it is desirable to add the function of changing a rotation ratio such a vernier dial to the analyzing processing part 13. That is, the analyzing processing part 13 has a function of making the angle of rotation of the dial 2121 smaller than the angle of rotation of the operation object 31 by only a predetermined rotation ratio. For example, it is possible to adjust the angle of rotation of the dial 2121 more precisely than the accuracy of detecting the contact position of the operation object 31 by setting the rotation ratio so that the dial 2121 is rotated once while the operation object 31 is rotated three times.

When the rotation ratio is set so as to make the angle of rotation of the dial 2121 smaller than the angle of rotation of the operation object 31, it is difficult to rotate the operation object 31 in accordance with the dial 2121, and the position of the operation object 31 is easily deviated from the tracking range Dt specified at the dial 2121. In particularly, if the user views the dial 2121 displayed on the display 20, the position of the operation object 31 becomes easy to deviate from the tracking range Dt.

In the operation mentioned above, the FIG. 21 for operation is moved when the contact position of the operation object 31 is deviated from the tracking range Dt. However, in the case where an operation is performed, in which the operation object 31 is rotated plural times, when the FIG. 21 for operation is moved according to the rotation of the operation object 31, the motion of the FIG. 21 for operation may become complicated. On the contrary, the convenience may be impaired. Therefore, when the rotation ratio is set so that the angle of rotation of the dial 2121 is smaller than the angle of rotation of the operation object 31, the analyzing processing part 13 desirably performs the following processing.

Figure 3:
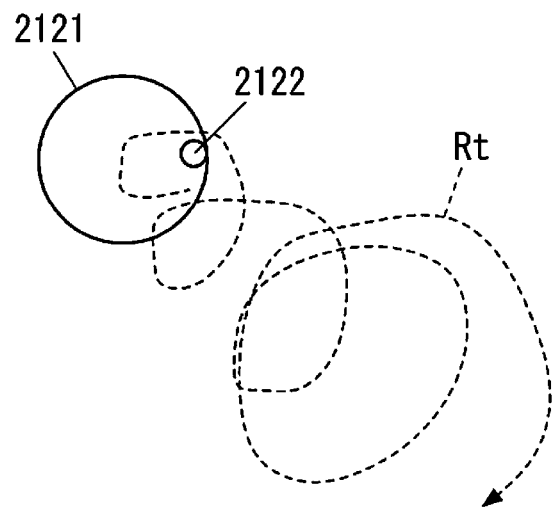
FIG. 3 is a figure showing the example of use of the embodiment.

That is, the analyzing processing part 13 continues determining that the operation content of the operation object 31 (operation of the operation object 31) is not the moving operation but the adjustment operation, even if the contact position is deviated from the tracking range Dt, while the rotation of the operation object 31 continues after the adjustment operation for changing the control amount of the load 40 is started. In this case, since the analyzing processing part 13 determines that the operation content of the operation object 31 (operation of the operation object 31) is not the moving operation, the position of the FIG. 21 for operation is not changed, but only the rotation of the dial 2121 is performed. For example, as shown in FIG. 3, after the adjustment operation for rotating the dial 2121 in the clockwise direction is started, while operation of rotating the operation object 31 is continued like the locus Rt shown with a dashed line, the analyzing processing part 13 determines that the operation content of the operation object 31 (operation of the operation object 31) is the adjustment operation and does not change the position of the dial 2121.

It is determined by the detection of the moving direction of the operation object 31 whether the operation object 31 is rotated. For example, in the case where the position of the dot 2122 before the operation starts is a position shown in FIG. 3, the operation object 31 is made to move upward or downward when being rotated. That is, it can be presumed with several relations with a detection position to the detection position at each of the operation object 31 times approximately whether the operation object 31 is rotated. It can be determined by the measurement of the movement speed whether the operation object 31 continues moving. Therefore, the analyzing processing part 13 determines whether the adjustment operation for rotating continues by using the position change and the movement speed of the operation object 31.

The rotation ratio may be set so that the angle of rotation of the dial 2121 is larger than the angle of rotation of the operation object 31. In the case where the analyzing processing part 13 sets the rotation ratio, if regulation of the rotation ratio is enabled, it is possible to set the rotation ratio according to the kind of the load 40.

As mentioned above, according to the present embodiment, since the moving operation for moving the FIG. 21 for operation is possible, there is the case where some FIG. 21 for operation stop settling in the display rectangle of the screen of the display 20 by the moving operation. Therefore, the analyzing processing part 13 is desirable to restrict the moving range of the FIG. 21 for operation so that the FIG. 21 for operation is positioned within the display rectangle of the screen of the display 20. Alternatively, when the FIG. 21 for operation stops settling in the display rectangle of a screen, the operation display device desirable notify a user by a beep sound or the like.

The operation display device according to the present invention includes a program for performing various functions. The program is a program causing a computer to function as an apparatus that includes the arithmetic and control part 10 (the display processing part 12, the analyzing processing part 13, and the load control part 14), the display 20, and the operation part 30. The operation display device may acquire the program by using a readable recording medium recording the program.

Although the present invention has been described with reference to a certain preferred embodiment, numerous modifications and variations can be made by those skilled in the art without departing from the true spirit and scope of this invention, namely claims.

The invention claimed is:

1. An operation display device comprising:
a display on which a figure for operation for adjusting a control amount instructed to a load is displayed, the load being external and distinct from the operation display device;
an operation part disposed on a screen of the display, the operation part being configured to output a signal indicating a contact position of an operation object;
an analyzing processing part configured to analyze an operation content of the operation object by receiving the signal from the operation part and associating the contact position of the operation object to the operation part with the figure for operation;
a display processing part configured to determine a form and a position of the figure for operation to be displayed on the display according to the operation content analyzed by the analyzing processing part; and
a load control part configured to adjust the control amount according to the operation content analyzed by the analyzing processing part,
wherein the analyzing processing part has a function of classifying the operation content into a moving operation for changing the position of the figure for operation and an adjustment operation for adjusting the control amount, the analyzing processing part being configured to determine that the operation content is the moving operation when the contact position of the operation object to the operation part is deviated from a tracking range set in accordance with the position of the figure for operation,
wherein the display processing part is configured to displace the figure for operation so that the contact position of the operation object is positioned within the tracking range when the analyzing processing part determines that the operation content is the moving operation, and
wherein upon detecting that the operation object contacts the operation part in an operation area, the analyzing processing part detects if the operation object moves within a prescribed determination period after contact, and
(i) if the operation object moves within the prescribed determination period after contact, the analyzing processing part allows for displacement of the figure for operation, and
(ii) if the operation object does not move within the prescribed determination period after contact, the analyzing processing part prevents displacement of the figure for operation, regardless of whether the operation object is moved, until the analyzing processing part detects the operation object being separated from the operation part.

2. The operation display device according to claim 1, wherein, in a case where a position at which the operation object starts contacting to the operation part is in an operation area set in the figure for operation, in a time period until the operation object separates from the operation part, the analyzing processing part is configured to determine that the operation content is the adjustment operation while the contact position of the operation object is in the tracking range, the analyzing processing part being configured to determine that the operation content is the moving operation while the contact position of the operation object is out of the tracking range.

3. The operation display device according to claim 2, wherein when a position at which the operation object starts contacting to the operation part is in the tracking range, the analyzing processing part is configured to instruct the display processing part so that the control amount instructed to the load control part is made to correspond to the position and the form of the figure for operation.

4. The operation display device according to claim 2,
wherein the figure for operation is a rectilinear operating part comprising a slider moving in a straight line, and
wherein the tracking range is set so as to contain, along a moving track of the slider, a whole area of the moving track.

5. The operation display device according to claim 2,
wherein the figure for operation is a rotation operation part comprising a dot indicating a dial, which rotates around a center of rotation, and a rotary of the dial, and
wherein the tracking range is set so as to contain, along a moving track of the dot, a whole area of the moving track.

6. The operation display device according to claim 1, wherein when a position at which the operation object starts contacting to the operation part is in the tracking range, the analyzing processing part is configured to instruct the display processing part so that the control amount instructed to the load control part is made to correspond to the position and the form of the figure for operation.

7. The operation display device according to claim 6,
wherein the figure for operation is a rectilinear operating part comprising a slider moving in a straight line, and
wherein the tracking range is set so as to contain, along a moving track of the slider, a whole area of the moving track.

8. The operation display device according to claim 6,
wherein the figure for operation is a rotation operation part comprising a dot indicating a dial, which rotates around a center of rotation, and a rotary of the dial, and
wherein the tracking range is set so as to contain, along a moving track of the dot, a whole area of the moving track.

9. The operation display device according to claim 1,
wherein the figure for operation is a rectilinear operating part comprising a slider moving in a straight line, and
wherein the tracking range is set so as to contain, along a moving track of the slider, a whole area of the moving track.

10. The operation display device according to claim 1,
wherein the figure for operation is a rotation operation part comprising a dot indicating a dial, which rotates around a center of rotation, and a rotary of the dial, and
wherein the tracking range is set so as to contain, along a moving track of the dot, a whole area of the moving track.

11. The operation display device according to claim 10, wherein the analyzing processing part is configured to set a rotating ratio so that an angle of rotation of the dial is smaller than an angle of rotation of the operation object.

12. The operation display device according to claim 11, wherein, in a time period until the operation object separates from the operation part after the analyzing processing part determines that the operation content is the adjustment operation, the analyzing processing part is configured to forbid displacement of the figure for operation and adjust the control amount according to the angle of rotation of the operation object while the operation object continues rotating.

13. The operation display device according to claim 1, wherein the analyzing processing part, if the operation object separates from the operation part after contacting to the operation part, is configured to instruct the display processing part so that the figure for operation is returned to an initial position.

14. A non-transitory readable medium recording a program causing a computer to function as an apparatus, the apparatus comprising:
    an display on which a figure for operation for adjusting a control amount instructed to a load is displayed, the load being external and distinct from the computer;
    an operation part disposed on a screen of the display, the operation part being configured to output a signal indicating a contact position of an operation object;
    an analyzing processing part configured to analyze an operation content of the operation object by receiving the signal from the operation part and associating the contact position of the operation object to the operation part with the figure for operation; and
    a display processing part configured to determine a form and a position of the figure for operation to be displayed on the display according to the operation content analyzed by the analyzing processing part,
    wherein the analyzing processing part has a function of classifying the operation content into a moving operation for changing the position of the figure for operation and an adjustment operation for adjusting the control amount,
    wherein the display processing part, when the contact position of the operation object to the operation part is out of a tracking range set in accordance with the position of the figure for operation, is configured to displace the figure for operation so that the contact position of the operation object is positioned within the tracking range, and
    wherein upon detecting that the operation object contacts the operation part in an operation area, the analyzing processing part detects if the operation object moves within a prescribed determination period after contact, and
    (i) if the operation object moves within the prescribed determination period after contact, the analyzing processing part allows for displacement of the figure for operation, and
    (ii) if the operation object does not move within the prescribed determination period after contact, the analyzing processing part prevents displacement of the figure for operation, regardless of whether the operation object is moved, until the analyzing processing part detects the operation object being separated from the operation part.

15. An operation display device comprising:
    a display on which a figure for operation for adjusting a control amount instructed to a load is displayed, the load being external and distinct from the operation display device;
    an operation part disposed on a screen of the display, the operation part being configured to output a signal indicating a contact position of an operation object; and
    an arithmetic and control part configured to analyze an operation content of the operation object by receiving the signal from the operation part and associating the contact position of the operation object to the operation part with the figure for operation;
    wherein the arithmetic and control part, when the contact position of the operation object to the operation part is deviated from a tracking range set in accordance with the position of the figure for operation, is configured to displace the figure for operation so that the contact position of the operation object is positioned within the tracking range, and
    wherein upon detecting that the operation object contacts the operation part in an operation area, the arithmetic and control part detects if the operation object moves within a prescribed determination period after contact, and
    (i) if the operation object moves within the prescribed determination period after contact, the arithmetic and control part allows for displacement of the figure for operation, and
    (ii) if the operation object does not move within the prescribed determination period after contact, the arithmetic and control prevents displacement of the figure for operation, regardless of whether the operation object is moved, until the arithmetic and control part detects the operation object being separated from the operation part.

* * * * *